(12) United States Patent
Zhang et al.

(10) Patent No.: US 11,023,485 B2
(45) Date of Patent: Jun. 1, 2021

(54) CUBE CONSTRUCTION FOR AN OLAP SYSTEM

(71) Applicant: INTERNATIONAL BUSINESS MACHINES CORPORATION, Armonk, NY (US)

(72) Inventors: Jun Wei Zhang, Shanghai (CN); Tao Xie, Shanghai (CN); Wei Xu, Shanghai (CN); Shan Fan, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 16/133,807

(22) Filed: Sep. 18, 2018

(65) Prior Publication Data

US 2020/0089799 A1 Mar. 19, 2020

(51) Int. Cl.
*G06F 17/00* (2019.01)
*G06F 16/25* (2019.01)
*G06F 16/28* (2019.01)
*G06F 16/22* (2019.01)

(52) U.S. Cl.
CPC ........ *G06F 16/254* (2019.01); *G06F 16/2264* (2019.01); *G06F 16/283* (2019.01)

(58) Field of Classification Search
CPC ... G06F 16/254; G06F 16/283; G06F 16/2264
See application file for complete search history.

(56) References Cited

U.S. PATENT DOCUMENTS

| | | | |
|---|---|---|---|
| 5,799,300 A * | 8/1998 | Agrawal | G06F 16/24556 |
| 5,987,467 A * | 11/1999 | Ross | G06F 16/283 |
| 6,829,621 B2 | 12/2004 | Keller | |
| 7,181,450 B2 | 2/2007 | Malloy et al. | |
| 7,392,242 B1 * | 6/2008 | Baccash | G06F 16/24539 |
| 8,868,544 B2 * | 10/2014 | Witkowski | G06F 16/283 |
| | | | 707/713 |
| 9,223,847 B2 | 12/2015 | Aski et al. | |
| 2004/0103092 A1 * | 5/2004 | Tuzhilin | G06F 16/283 |

(Continued)

FOREIGN PATENT DOCUMENTS

CN 101183368 B 5/2010

OTHER PUBLICATIONS

Niemi et al., "Constructing OLAP Cubes Based on Queries", Nov. 9, 200 I, Atlanta, Georgia, Copyright 2001 ACM I-581, 7 pages.

(Continued)

*Primary Examiner* — Hasanul Mobin
(74) *Attorney, Agent, or Firm* — Richard A. Wilhelm (57) ABSTRACT

Embodiments relate to cube construction. According to a method, a plurality of valid history queries that request to retrieve a cube comprising a first number of cuboids in an On-Line Analytical Processing (OLAP) system are collected. A plurality of dimension combinations is acquired from the plurality of valid history queries. A query frequency of each cuboid of a second number of cuboids with the plurality of dimension combinations is determined, the second number of cuboids being a subset of the first number of cuboids. A cuboid construction sequence for the second number of cuboids is determined based on the query frequency. The cube is constructed based on the cuboid construction sequence.

20 Claims, 5 Drawing Sheets

(56) References Cited

U.S. PATENT DOCUMENTS

| | | | |
|---|---|---|---|
| 2005/0246357 A1 | 11/2005 | Geary et al. | |
| 2006/0010113 A1* | 1/2006 | Berger | G06F 16/2445 |
| 2006/0010114 A1* | 1/2006 | Dumitru | G06F 16/2445 |
| 2009/0144245 A1* | 6/2009 | Nos | G06F 16/283 |
| 2009/0327330 A1* | 12/2009 | Abouzied | G06F 16/2453 |
| 2010/0198777 A1* | 8/2010 | Lo | G06F 16/283 |
| | | | 707/601 |
| 2010/0280857 A1* | 11/2010 | Liu | G06Q 10/087 |
| | | | 707/600 |
| 2012/0179643 A1* | 7/2012 | Chaki | G06F 16/283 |
| | | | 707/602 |
| 2013/0325428 A1* | 12/2013 | Mande | G16B 40/00 |
| | | | 703/11 |
| 2015/0294001 A1 | 10/2015 | Xu | |
| 2015/0310082 A1* | 10/2015 | Han | G06F 16/283 |
| | | | 707/602 |
| 2016/0048572 A1* | 2/2016 | Khandelwal | G06F 16/283 |
| | | | 707/604 |
| 2017/0116227 A1* | 4/2017 | Shaked | G06F 16/283 |

OTHER PUBLICATIONS

Qiaoneg Qian, "Cube Planner—Build an Apache Kylin OLAP Cube Efficiently and Intelligently", ebay tech blog, Aug. 2, 2017, Copyright © 2010-2017 eBay Inc., 8 pages.
Singh, "Constructing the OLAP Cube from Relational Databases / Flat Files", International Journal of Computer Trends and Technology—vol.2 Issue2—2011, ISSN: 2231-2803, 11 pages.

* cited by examiner

CUBE CONSTRUCTION FOR AN OLAP SYSTEM

BACKGROUND

Embodiments of the present invention relates to data processing and more specifically, to a cube construction method and system.

A tremendous amount of data is processed in an Online Analytical Processing (OLAP) systems for multi-dimensional analysis. As an analyst reviews data in an OLAP system, the analyst can ask questions and receive immediate answers via queries.

BRIEF SUMMARY

Embodiments of the present invention are directed to a method, a system and computer program product. According to one embodiment, a plurality of valid history queries that request to retrieve a cube comprising a first number of cuboids in an On-Line Analytical Processing (OLAP) system are collected. A plurality of dimension combinations is acquired from the plurality of valid history queries. Query frequency of each cuboid of a second number of cuboids with the plurality of dimension combinations are determined, the second number of cuboids being a subset of the first number of cuboids. A cuboid construction sequence of the second number of cuboids is determined based on the query frequency. The cube is constructed based on the cuboid construction sequence.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise. Now, the present invention will be described using particular embodiments, and the embodiments described hereafter are understood to be only referred as examples and are not intended to limit the scope of the present invention.

One or more embodiments according to the present invention are directed to methods, computer systems, storage systems and computer program products for reclaiming data from a source medium to a target medium in a storage system.

While steps of the disclosed method and components of the disclosed systems and environments have been sequentially or serially identified using numbers and letters, this numbering or lettering is not an indication that the steps must be performed in the order recited and is merely provided to facilitate clear referencing of the method's steps. Furthermore, steps of the method may be performed in parallel to perform their described functionality.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
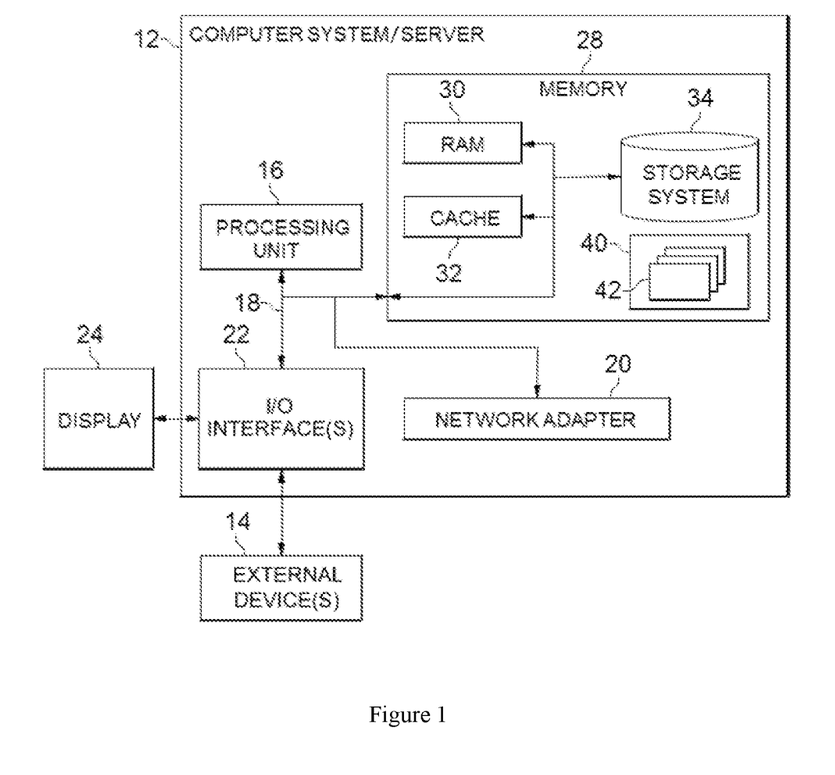
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
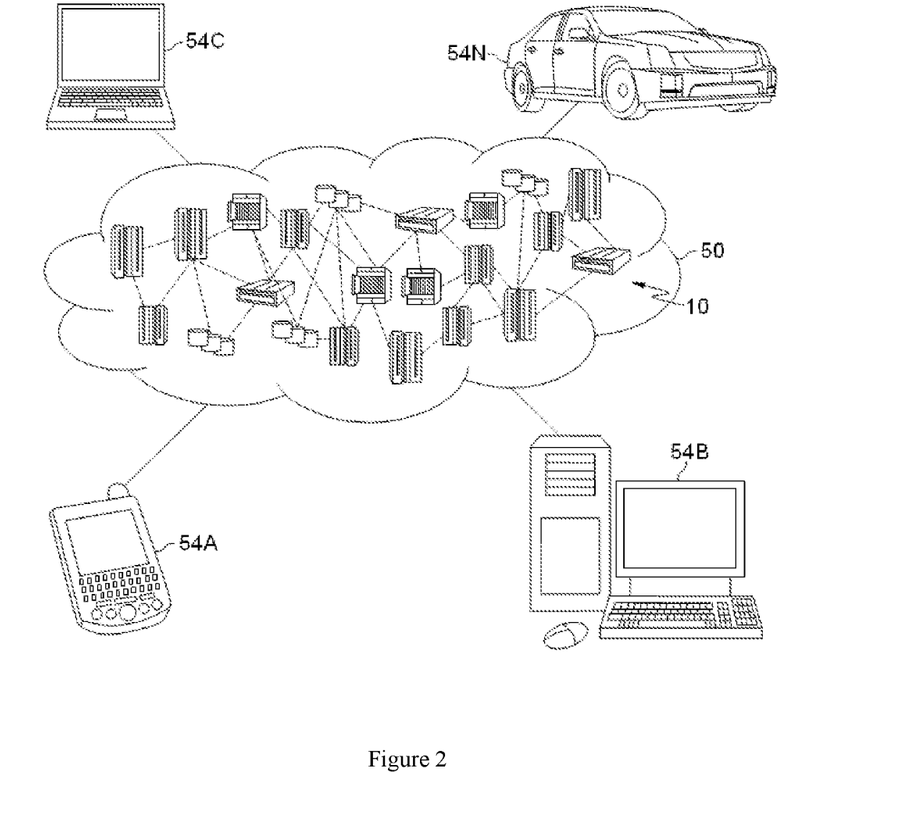
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
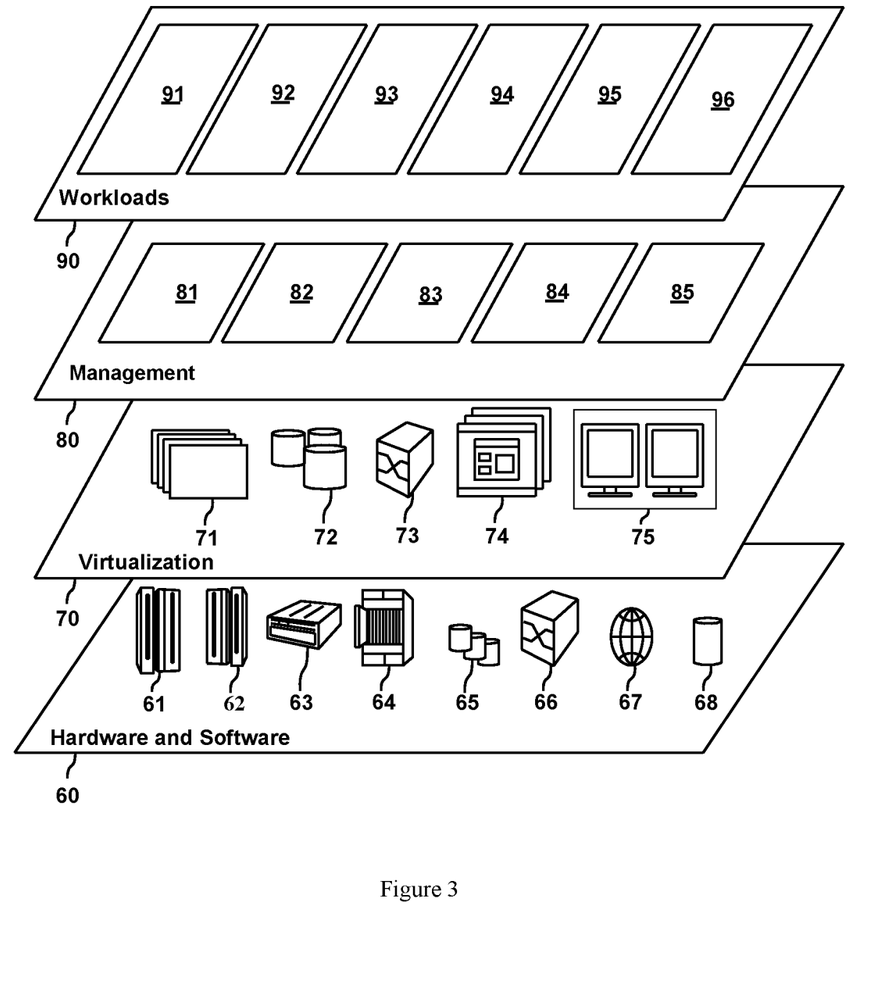
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cube construction 96.

To reduce query response time in an OLAP system, "pre-aggregation", which is a batch processing of data after the data is loaded before the query is received, is usually used as an important strategy for the OLAP system. In this way, the processing for a complex multi-dimensional query can be transformed into simple data fetch rather than in-time massive data processing. The multi-dimensional data in the OLAP system is typically organized and represented in a form of a cube, in which various dimensions of data can be reflected as multi-dimensions of the cube.

To make those in the art better understand present disclosure, some fundamental concepts regarding to cube construction are introduced herein, which are not intended to limit the scope of present disclosure.

Cube: A cube is a structured multidimensional data set to allow for fast analysis of data from multiple perspectives. Typically, a cube consists of numeric facts called measures which are categorized by dimensions. The cube metadata is typically created from a star schema or snowflake schema of tables in a relational database. Measures are derived from the records in the fact tables and dimensions are derived from the dimension tables.

Measures: Measures are derived from the fact tables and identify the numerical values that are summarized for multidimensional data analysis, such as price, cost, or quantity sold. The collection of the measures forms a dimension. In other words, a measure has a set of labels, where the description of the labels is provided in the corresponding dimension.

Dimensions: Dimensions provide the categorical descriptions by which the measures are separated for analysis. A dimension is a list of values that provides categories for data. A dimension acts as an index for identifying values of a variable. For example, if sales data has a separate sales figure for each month, then the data has a MONTH dimension. That is, the data is organized by month. A dimension is similar to a key in a relational database. Data that is organized by two or more dimensions is referred to as "multidimensional data".

Dimension combination: dimension combinations refer to any combination of all dimensions for a cube. Suppose a cube has three dimensions (time, location, category), then it has eight kinds of dimension combinations: [time], [location], [category], [time, location], [time, category], [location, category], [time, location, category].

Cuboid: A cuboid consists of aggregation results of measures for a dimension combination of a cube. A cube is collection of all cuboids. For example, if a cube has N dimensions, then there are $2^N$ cuboids. When a query is received, the most appropriate cuboid is hit according to the dimensions in the query.

Figure 4:
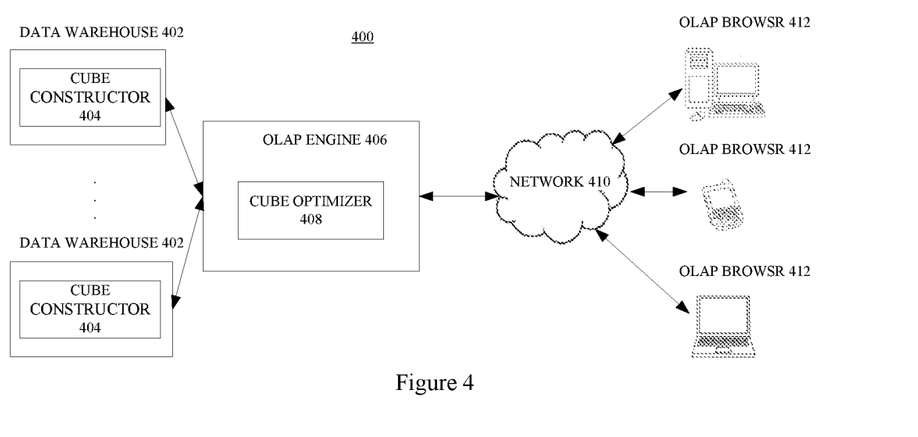
FIG. 4 depicts an OLAP system in which the present disclosure can be implemented according to an embodiment of the present invention.

To reduce query response time, a query result can be prepared in advance in an OLAP system. However, which dimension combination a user would query cannot be determined before a query is received from the user in the OLAP system. So query results for all possible dimension combinations for a cube have to be calculated in advance in the OLAP system. In a known solution, a cube is constructed in a cuboid sequence from a cuboid with more dimensions to a cuboid with less dimensions. Taking a N-dimensional cube as an example, a cuboid with N dimension is built first, then a cuboid with (N−1) dimension is built, and then cuboid with (N−2) dimension is built . . . finally a cuboid with 0 dimension is built. The calculation for "pre-aggregation" is extremely time consuming and storage consuming with the increasing of the number of the dimensions. As new data is continually imported into Data warehouses 402, the cube needs to be updated accordingly. So currently the cube is constructed periodically. To optimize the calculation for the "pre-aggregation", the existing solutions focus on how dimensions combine with each other, such as applying hierarchy dimension and mandatory dimension. However, these solutions take a lot of time to optimize dimension definitions and are not users demand-oriented. Accordingly, there is a need to optimize the cube construction process to improve users' experience.

FIG. 4 depicts an OLAP system 400 in which the present disclosure can be implemented according to an embodiment of the present invention. Data warehouses 402 are central repositories of integrated data from one or more disparate sources (such as marketing data or sales data). Data warehouses 402 comprises dimension tables and fact tables. To improve query efficiency, data stored in dimension tables and facts tables is often pre-aggregated and summarized to construct a cube. The cube is constructed in Cube constructors 404. OLAP engine 406 can provide functions of data management, data import and data query, etc. OLAP engine 406 and Data warehouses 402 can be deployed in different data nodes in a distributed system. Users such as analytics can review data from multidimensional perspectives and submit their queries via OLAP browsers 412 in client sides. The queries are received by OLAP engine 406 via network 410, then OLAP engine 406 can send the queries to Data warehouses 402 for cube query process. Query results as an immediate response can be returned to the users from OLAP engine 406. OLAP system 400 depicted in FIG. 4 is just for illustrative purpose but is not intended to suggest any limitation as to the scope of embodiments of present invention described herein. Those skilled in the art can make many modifications and variation without departing from the scope and spirit of the described embodiments. For example, query results can be transferred to the users directly from Data warehouses 402. Cube constructors 404 is not necessary to be integrated with Data warehouses 402 and can be deployed in an independent data node.

The present disclosure provides a mechanism to optimize cube construction process by analyzing the statistic of history queries. This optimization mechanism fully considers users' demands and can reduce query response time.

Figure 5:
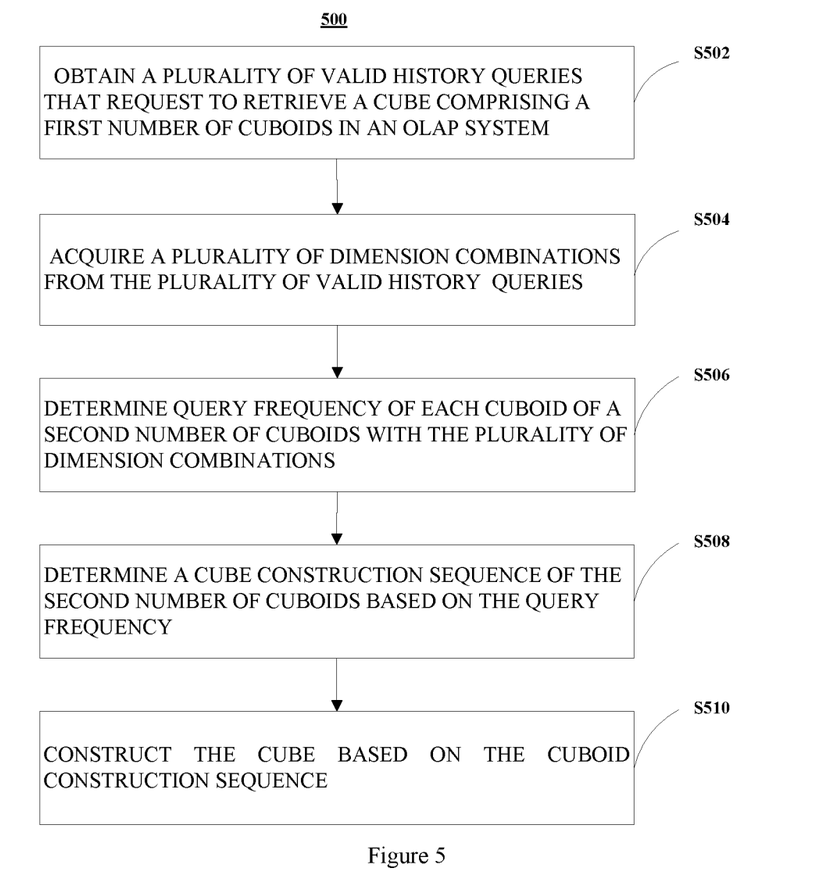
FIG. 5 depicts an exemplary method for constructing a cube according to an embodiment of the present invention.

FIG. 5 describes an exemplary method for constructing a cube according to an embodiment of the present invention. As depicted in FIG. 5, at step S502, a plurality of valid history queries that request to retrieve a cube comprising a first number of cuboids in an On-Line Analytical Processing (OLAP) system are obtained. At step S504, a plurality of dimension combinations are acquired from the plurality of valid history queries. At step S506, query frequency of each cuboid of a second number of cuboids with the plurality of dimension combinations are determined, the second number of cuboids being a subset of the first number of cuboids. At step S508, a cuboid construction sequence of the second number of cuboids is determined based on the query frequency. At step S510, the cube is constructed based on the cuboid construction sequence.

According to an embodiment of present disclosure, steps S502-S508 can be implemented in Cube optimizer 408 in FIG. 4. As shown in FIG. 4, Cube optimizer 408 is a part of OLAP engine 406. It can be understood for those in the art, Cube optimizer 408 is not necessary to be integrated with OLAP engine 406 and can be independent from OLAP engine 406. According to an embodiment of present disclosure, Cube optimizer 408 can be a submodule of Data warehouses 402. According to another embodiment of present disclosure, Cube optimizer 408 can be integrated with Cube constructors 404.

Users of an OLAP system may query cuboids of a cube using specialized query languages such as Structured Query Language (SQL) and Multidimensional Expressions (MDX). MDX is a query language for querying and manipulating the multidimensional data stored in cubes. A simple MDX select statement has the following form:

SELECT <axis specification>, <axis specification>, . . .
FROM <cube specification>
WHERE <slicer specification>

The axis specification describes how to produce one of the dimensions in the result. The slicer specification allows users to eliminate unwanted dimensions from the query results. Usually, the WHERE clause is used to define the measure that is being queried.

The following shows a simple MDX query:
"SELECT country, city, product
FROM cube A
WHERE country='CHINA'"

This example MDX query would access a three-dimensional cuboid where country, city and product are three dimensions and CHINA is a measure. This three-dimensional cuboid with a dimension combination (country, city, product) is included in a five-dimensional sales cube A with dimensions country, city, product, price and channel.

At step S502, all history queries that have requested to retrieve a cube comprising a first number of cuboids can be stored in OLAP engine 406. Some history queries, which have been successfully processed with returning results, are called valid history queries. Some history queries, which are failed processed with error results, are called invalid history queries. Valid history queries during a past period of time (such as a last week, a last month) can be obtained from OLAP engine 406. Since a cube can be constructed periodically, the valid history queries can be collected periodically. Normally, the valid history queries obtained in an interval between two cube construction periods can be used to optimize the cube construction in the next cube construction period.

At step S504, a plurality of dimension combinations can be acquired from valid history queries. As cited above, dimensions of a cube are predefined before cube construction. Using these dimensions as keywords, dimensions included in valid history queries can be identified. Any known keywords search technologies can be applied to the dimension search. Taking above MDX query as an example, cube dimensions country, city, product, price and channel, can be used as keywords to search in the MDX query. Then the dimensions country, city, product can be identified from the MDX query through keywords search. The dimension combination for this MDX query can be determined to be (country, city, product).

It is assumed that 255 valid history queries against the sales cube A can be obtained from OLAP engine 406. Similarly, all dimension combinations can be acquired from the valid history queries. The 255 valid history queries include five kinds of dimension combinations: (country, city, product), (country, city, product, price), (country, city, price), (product, price, channel) and (product, price). At step S506, query frequency of each cuboid of a second number of cuboids with the plurality of dimension combinations are determined, where a second number of cuboids is a subset of the first number of cuboids of the cube. Herein, the query frequency of a cuboid refers to how many times the cuboid was queried. Table 1 shows the query frequency of cuboids A, B, C, D and E with the five kinds of dimension combinations. It can be seen from Table 1 that cuboid A with dimension combination (country, city, product) was queried 100 times, cuboid B with dimension combination (country, city, product, price) was queried 60 times, cuboid C with dimension combination (country, city, price) was queried 40 times, cuboid D with dimension combination (product, price, channel) was queried 35 times and cuboid E with dimension combination (product, price) was queried 20 times.

TABLE 1

| Cuboids | Dimension combinations | Query frequency |
|---|---|---|
| A | (country, city, product) | 100 |
| B | (country, city, product, price) | 60 |
| C | (country, city, price) | 40 |
| D | (product, price, channel) | 35 |
| E | (product, price) | 20 |

At step S508, a cuboid construction sequence of the second number of cuboids is determined based on the query frequency. Then Cube constructors 404 can implement cube construction based on the cuboid construction sequence. The cube construction cited herein refers to the cube update process after the cube has been initially constructed. As new data continually is imported to Data warehouses 402, the cube can be updated accordingly. However, the cube cannot be updated at any time for computing resource limitation. Usually, a cube needs to be updated periodically such as daily, weekly, etc.

At step S510, the cube is constructed based on the cuboid construction sequence. According to an embodiment of present disclosure, Cube optimizer 408 is a submodule of OLAP engine 406. So the cuboid construction sequence of the second number of cuboids can be transferred from OLAP engine 406 to Cube constructors 404. According to another embodiment of present disclosure, Cube optimizer 408 is a submodule of Data warehouses 402. Cube constructors 404 can acquire the cuboid construction sequence of the second number of cuboids from Cube optimizer 408 directly. After receiving the cuboid construction sequence of the second number of cuboids, Cube constructors 404 can implement cube construction based on the cuboid construction sequence.

According to an embodiment of present disclosure, the second number of cuboids can be constructed with a first priority in the next cube construction period. After completion of the construction of the second number of cuboids, other cuboids may be constructed based on an established sequence in any existing cube construction method. According to an embodiment of present disclosure, the cuboid construction sequence comprises a first cuboid construction sequence in which the second number of cuboids are sorted from high query frequency to low query frequency. Taking Table 1 as an example, cuboids can be sorted as cuboids A, B, C, D and E from high query frequency to low query frequency. Accordingly, the first cuboid construction sequence can be determined to be a sequence of cuboids A, B, C, D and E. In the next cube construction period, Cube constructors 404 can first construct the cuboids A, B, C, D and E based on the first cuboid construction sequence, then construct other cuboids. According to present disclosure, the more frequently the cuboid is accessed, the earlier the cuboid is constructed in the cube construction process. If a query to access cuboid A is received during the cube construction, it is possible for the user to wait for the response for a while for cuboid A has not been constructed according to the known art. However, according to present disclosure, since cuboid A is most frequently accessed in the query, cuboid A can be constructed as early as possible. Accordingly, when the query to access cuboid A is received during the cube construction, the user can receive an immediate response without delay. Therefore, the response time of most frequently used queries can be reduced during cube construction and the users' experience can be improved.

According to an embodiment of present disclosure, the second number of cuboids can be divided into at least two groups based on at least one predefined threshold. The cuboid construction sequence comprises a second cuboid construction sequence in which the second number of cuboids can be divided into at least two groups. Then Cube constructors 404 can implement cube construction based on the second cuboid construction sequence. For example, the second number of cuboids can be divided into a first group and a second group, wherein the query frequency of each cuboid in the first group is greater than a first threshold, and the query frequency of each cuboid in the second group is less than or equal to the first threshold. Accordingly, the second cuboid construction sequence is determined to be in a sequence of the first group and the second group. In the next cube construction period, the cuboids in the first group may be first constructed, then the cuboids in the second group may be constructed. Taking Table 1 as an example, assuming the first threshold is 50, then the first group comprises cuboids A and B and the second group comprises cuboids C, D and E. Based on the second cuboid construction sequence, cuboids A and B may be constructed first, then cuboids C, D and E may be constructed.

According to an embodiment of present disclosure, for each group of the at least two groups, the cuboid construction sequence comprises a third cuboid construction sequence of cuboids in each group, the third cuboid construction sequence is determined based on a construction factor M of each cuboid in each group, and M=f (K, T), where M is a function of K and T, and K refers to the number of dimension of each cuboid, and T refers to an average construction time of each cuboid, and M is proportional to K and is inversely proportional to T, for example, M=K/T or M=$K^{(1/T)}$. As cube construction is proceeding, an average construction time for each cuboid can be calculated. For example, for each cuboid, three timeslots of construction time ($T_1$, $T_2$, $T_3$) for a certain number of rows such as 10k rows can be recorded, then an average construction time T can be further acquired by ($T_1$, $T_2$, $T_3$)/3. A third cuboid construction sequence of the cuboids in each group can be determined to be a sequence in which the cuboids in the group are sorted from high value of construction factor to low value of construction factor.

Taking Table 1 as an example, additional two columns (Average construction time T and Construction factor M) are added to Table 1 to form Table 2. As shown in Table 2, for cuboid A, the average construction time is 5 seconds per 10k rows and the construction factor is 3/5. For cuboid B, the average construction time is 3 seconds per 10k rows and the construction factor is 4/3. For cuboid C, the average construction time is 4 seconds per 10k rows and the construction factor is 3/4. For cuboid D, the average construction time is 3 seconds per 10k rows and the construction factor is 1. For cuboid E, the average construction time is 4 seconds per 10k rows and the construction factor is 1/2. For cuboids A and B in the first group, the value of construction factor M for cuboid B is greater than that for cuboid A, i.e., 4/3>3/5. So cuboid B may be first constructed, then cuboid A may be constructed. For cuboids C, D and E in the second group, the value of construction factor for cuboid D is greater than that for cuboid C, i.e., 1>3/4, and the value of construction factor for cuboid C is greater than that for cuboid E, i.e., 3/4>1/2. Therefore, cuboid D may be first constructed, then cuboid C may be constructed, and cuboid E may be constructed at last. This embodiment indicates that, the greater the construction factor for a cuboid in each group is, the higher construction priority the cuboid has. Based on the second cuboid construction sequence and the third cuboid construction sequence, the cuboid construction sequence can be determined to be a sequence of cuboids B, A, D, C and E. In the next cube construction period, Cube constructors 404 can first construct cuboids in the sequence of cuboids B, A, D, C and E, then construct other cuboids.

TABLE 2

| Cuboids | Dimension combinations | uery Frequency | Average construction Time T (Seconds per 10k rows) | Construction Factor M (K/T) |
| --- | --- | --- | --- | --- |
| A | (country, city, product) | 100 | 5 | 3/5 |
| B | (country, city, product, price) | 0 | 3 | 4/3 |
| C | (country, city, price) | 40 | 4 | 3/4 |
| D | (product, price, channel) | 5 | 3 | 1 |
| E | (product, price) | 20 | 4 | 1/2 |

According to an embodiment of present disclosure, for each group of the at least two groups, cuboids in each group can be constructed in parallel. According to another embodiment of present disclosure, for each group of the at least two groups, cuboids in each group can be constructed in random sequence.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
   obtaining, by one or more processors, a plurality of valid history queries that request to retrieve a cube comprising a first number of cuboids in an On-Line Analytical Processing (OLAP) system, wherein the one or more processors are hardware devices;
   acquiring, by the one or more processors, a plurality of dimension combinations from the plurality of valid history queries;
   determining, by the one or more processors, query frequency of each cuboid of a second number of cuboids with the plurality of dimension combinations, the second number of cuboids being a subset of the first number of cuboids;
   determining, by the one or more processors, a cuboid construction sequence of the second number of cuboids based on the query frequency, wherein the determining the cuboid construction sequence of the second number of cuboids based on the query includes dividing the second number of cuboids into at least two groups based on at least one predefined threshold; and
   constructing, by the one or more processors, the cube based on the cuboid construction sequence.

2. The method of claim 1, wherein the constructing the cube based on the cuboid construction sequence further comprises:
   constructing, by the one or more processor, the second number of cuboids with a first priority.

3. The method of claim 2, wherein the cuboid construction sequence comprises a first cuboid construction sequence in which the second number of cuboids are sorted from high query frequency to low query frequency.

4. The method of claim 2,
   wherein the determined cuboid construction sequence of the second number of cuboids based on the query comprises a second cuboid construction sequence of the at least two groups.

5. The method of claim 4, wherein for each group of the at least two groups, the cuboid construction sequence comprises a third cuboid construction sequence of cuboids in each group, the third cuboid construction sequence being determined based on a construction factor M of each cuboid in each group, and M=f (K, T), where M is a function of K and T, and K refers to the number of dimension of each cuboid, and T refers to an average construction time of each cuboid, and M is proportional to K and is inversely proportional to T.

6. The method of claim 4, wherein the constructing the cube based on the cuboids construction sequence further comprises:

for each group of the at least two groups, constructing, by the one or more processors, the cuboids in each group in parallel.

7. The method of claim 4, wherein the constructing the cube based on the cuboids construction sequence further comprises:
for each group of the at least two groups, constructing, by the one or more processors, the cuboids in each group in random sequence.

8. A computer system comprising:
one or more processors and a bus;
a memory coupled to the one or more processors via the bus, wherein the memory comprises program instructions that when executed by the one or more processing units implements a method comprising:
obtaining a plurality of valid history queries that request to retrieve a cube comprising a first number of cuboids in an On-Line Analytical Processing (OLAP) system;
acquiring a plurality of dimension combinations from the plurality of valid history queries;
determining query frequency of each cuboid of a second number of cuboids with the plurality of dimension combinations, the second number of cuboids being a subset of the first number of cuboids;
determining a cuboid construction sequence of the second number of cuboids based on the query frequency, wherein the determining the cuboid construction sequence of the second number of cuboids based on the query includes dividing the second number of cuboids into at least two groups based on at least one predefined threshold; and
constructing the cube based on the cuboid construction sequence.

9. The computer system of claim 8, wherein the constructing the cube based on the cuboid construction sequence further comprises:
constructing the second number of cuboids with a first priority.

10. The computer system of claim 9, wherein the cuboid construction sequence comprises a first cuboid construction sequence in which the second number of cuboids are sorted from high query frequency to low query frequency.

11. The computer system of claim 9,
wherein the determined cuboid construction sequence of the second number of cuboids based on the query comprises a second cuboid construction sequence of the at least two groups.

12. The computer system of claim 11, wherein for each group of the at least two groups, the cuboid construction sequence comprises a third cuboid construction sequence of cuboids in each group, the third cuboid construction sequence being determined based on a construction factor M of each cuboid in each group, and M=f (K, T), where M is a function of K and T, K refers to the number of dimension of each cuboid, and T refers to an average construction time of each cuboid, and M is proportional to K and is inversely proportional to T.

13. The computer system of claim 11, wherein the constructing the cube based on the cuboids construction sequence further comprises:
for each group of the at least two groups, constructing the cuboids in each group in parallel.

14. The computer system of claim 11, wherein the constructing the cube based on the cuboids construction sequence further comprises:
for each group of the at least two groups, constructing the cuboids in each group in random sequence.

15. A computer program product comprising a computer readable storage medium having program instructions embodied therewith, the program instructions executable by one or more hardware processors to cause the one or more processors to perform actions of:
obtaining a plurality of valid history queries that request to retrieve a cube comprising a first number of cuboids in an On-Line Analytical Processing (OLAP) system;
acquiring a plurality of dimension combinations from the plurality of valid history queries;
determining query frequency of each cuboid of a second number of cuboids with the plurality of dimension combinations, the second number of cuboids being a subset of the first number of cuboids;
determining a cuboid construction sequence of the second number of cuboids based on the query frequency, wherein the determining the cuboid construction sequence of the second number of cuboids based on the query includes dividing the second number of cuboids into at least two groups based on at least one predefined threshold; and
constructing the cube based on the cuboid construction sequence.

16. The computer program product of claim 15, wherein the constructing the cube based on the cuboid construction sequence further comprises:
constructing the second number of cuboids with a first priority.

17. The computer program product of claim 16, wherein the cuboid construction sequence comprises a first cuboid construction sequence in which the second number of cuboids are sorted from high query frequency to low query frequency.

18. The computer program product of claim 16,
wherein the determined cuboid construction sequence of the second number of cuboids based on the query comprises a second cuboid construction sequence of the at least two groups.

19. The computer program product of claim 18, wherein for each group of the at least two groups, the cuboid construction sequence comprises a third cuboid construction sequence of cuboids in each group, the third cuboid construction sequence being determined based on a construction factor M of each cuboid in each group, and M=f (K, T), where M is a function of K and T, and K refers to the number of dimension of each cuboid, and T refers to an average construction time of each cuboid, and M is proportional to K and is inversely proportional to T.

20. The computer program product of claim 18, wherein the constructing the cube based on the cuboids construction sequence further comprises:
for each group of the at least two groups, constructing, by the one or more processors, the cuboids in each group in parallel.

* * * * *